United States Patent
Line et al.

(10) Patent No.: US 9,889,773 B2
(45) Date of Patent: Feb. 13, 2018

(54) ANTHROPOMORPHIC UPPER SEATBACK

(71) Applicant: Ford Global Technologies, LLC, Dearborn, MI (US)

(72) Inventors: Johnathan Andrew Line, Northville, MI (US); Marcos Silva Kondrad, Macomb, MI (US); Daniel Ferretti, Commerce Township, MI (US); John Wayne Jaranson, Dearborn, MI (US); Michael Kolich, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/089,676

(22) Filed: Apr. 4, 2016

(65) Prior Publication Data

US 2017/0282757 A1    Oct. 5, 2017

(51) Int. Cl.
    *B60N 2/22*   (2006.01)
    *B60N 2/64*   (2006.01)
    *B60N 2/68*   (2006.01)

(52) U.S. Cl.
    CPC ........... *B60N 2/2222* (2013.01); *B60N 2/643* (2013.01); *B60N 2/68* (2013.01)

(58) Field of Classification Search
    CPC .......... B60N 2/2222; B60N 2/643; B60N 2/68
    USPC ...... 297/216.12, 284.9, 408, 452.33, 452.34, 297/452.35, 452.36, 354.11
    See application file for complete search history.

(56) References Cited

U.S. PATENT DOCUMENTS

| | | | |
|---|---|---|---|
| 616,178 | A | 12/1898 | Barron |
| 771,773 | A | 10/1904 | Feely |
| 1,125,155 | A | 1/1915 | Nunn |
| 2,272,505 | A | 2/1942 | Biggs |
| 2,661,050 | A | 12/1953 | Felter |
| 2,725,921 | A | 12/1955 | Markin |

(Continued)

FOREIGN PATENT DOCUMENTS

| | | |
|---|---|---|
| CN | 201650491 U | 11/2010 |
| CN | 203097995 U | 7/2013 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Rodney B White
(74) *Attorney, Agent, or Firm* — Vichit Chea; Price Heneveld LLP (57) ABSTRACT

A vehicle seating assembly includes a seatback frame. An articulating upper thoracic region is operably coupled with the seatback frame and includes a cross-vehicle support, a torso vertical support, and a suspension support. The articulating upper thoracic region is pivotally coupled with a mid-portion of the seatback frame between stowed and deployed positions. A back panel is operably coupled to a rear side of the seatback frame. A front close-out panel is disposed between a rear portion of the articulating upper thoracic region and the back panel. A peripheral gap is disposed between the front close-out panel and the articulating upper thoracic region.

20 Claims, 4 Drawing Sheets

(56) References Cited

U.S. PATENT DOCUMENTS

| | | |
|---|---|---|
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lohr |
| 3,632,166 A | 1/1972 | Lohr |
| 3,663,057 A | 5/1972 | Lohr et al. |
| 3,669,492 A | 6/1972 | Peterson |
| 3,779,577 A | 12/1973 | Wilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Wahlmann et al. |
| 4,522,445 A | 6/1985 | Göldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | Isono et al. |
| 4,609,221 A | 9/1986 | Böttcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Boisset |
| 4,693,513 A | 9/1987 | Heath |
| 4,693,515 A * | 9/1987 | Russo .................. B60N 2/4829 297/408 X |
| 4,707,027 A | 11/1987 | Horvath et al. |
| 4,718,723 A | 1/1988 | Bottemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krügener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | DiMatteo et al. |
| 4,822,092 A | 4/1989 | Sweers |
| 4,833,614 A | 5/1989 | Saitoh et al. |
| 4,840,429 A | 6/1989 | Stöckl |
| 4,856,844 A | 8/1989 | Isono |
| 4,858,992 A | 8/1989 | LaSota |
| 4,861,104 A | 8/1989 | Malak |
| 4,884,843 A | 12/1989 | DeRees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido et al. |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Wahls |
| 5,120,109 A | 6/1992 | Rangoni |
| 5,127,708 A | 7/1992 | Kishi et al. |
| 5,129,704 A | 7/1992 | Kishi et al. |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A | 8/1996 | Vu Khac et al. |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A * | 6/1998 | Massara ............... B60N 2/2222 297/216.12 |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |

(56) References Cited

U.S. PATENT DOCUMENTS

| | | | |
|---|---|---|---|
| 5,823,620 A | 10/1998 | Le Caz | |
| 5,826,938 A | 10/1998 | Yanase et al. | |
| 5,829,838 A * | 11/1998 | Offenbacher | B60N 2/4802 297/408 X |
| 5,836,648 A * | 11/1998 | Karschin | B60N 2/2222 297/216.12 |
| 5,860,699 A | 1/1999 | Weeks | |
| 5,863,092 A | 1/1999 | Kifer | |
| 5,868,450 A | 2/1999 | Hashimoto | |
| 5,882,073 A | 3/1999 | Burchi et al. | |
| 5,893,609 A | 4/1999 | Schmidt | |
| 5,895,070 A | 4/1999 | Crimmins et al. | |
| 5,902,014 A | 5/1999 | Dinkel et al. | |
| 5,906,586 A | 5/1999 | Graham | |
| 5,913,568 A | 6/1999 | Brightbill et al. | |
| 5,944,341 A | 8/1999 | Kimura et al. | |
| 5,951,039 A | 9/1999 | Severinski et al. | |
| 5,967,608 A | 10/1999 | Van Sickle | |
| 5,975,629 A | 11/1999 | Lorbiecki | |
| 5,975,637 A | 11/1999 | Geuss et al. | |
| 5,979,985 A | 11/1999 | Bauer et al. | |
| 5,983,940 A | 11/1999 | Smith | |
| 5,988,674 A | 11/1999 | Kimura et al. | |
| 6,019,387 A | 2/2000 | Jost | |
| 6,019,424 A * | 2/2000 | Ruckert | B60N 2/2222 297/216.12 |
| 6,024,378 A | 2/2000 | Fu | |
| 6,024,406 A | 2/2000 | Charras et al. | |
| 6,030,040 A | 2/2000 | Schmid et al. | |
| 6,050,635 A | 4/2000 | Pajon et al. | |
| 6,056,366 A | 5/2000 | Haynes et al. | |
| 6,062,642 A | 5/2000 | Sinnhuber et al. | |
| 6,068,339 A | 5/2000 | Linzalone | |
| 6,079,781 A | 6/2000 | Tilley | |
| 6,088,642 A | 7/2000 | Finkelstein et al. | |
| 6,106,071 A | 8/2000 | Aebischer et al. | |
| 6,106,163 A | 8/2000 | Inana et al. | |
| 6,109,690 A | 8/2000 | Wu et al. | |
| 6,135,561 A * | 10/2000 | Kruger | B60N 2/4885 297/216.12 X |
| 6,145,925 A | 11/2000 | Eksin et al. | |
| 6,155,593 A | 12/2000 | Kimura et al. | |
| 6,158,812 A | 12/2000 | Bonke | |
| 6,161,231 A | 12/2000 | Kraft et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,199,252 B1 | 3/2001 | Masters et al. | |
| 6,199,900 B1 | 3/2001 | Zeigler | |
| 6,199,951 B1 | 3/2001 | Zeile et al. | |
| 6,203,105 B1 | 3/2001 | Rhodes, Jr. | |
| 6,206,466 B1 | 3/2001 | Komatsu | |
| 6,217,062 B1 | 4/2001 | Breyvogel et al. | |
| 6,217,118 B1 | 4/2001 | Heilig | |
| 6,220,661 B1 | 4/2001 | Peterson | |
| 6,224,150 B1 | 5/2001 | Eksin et al. | |
| 6,231,068 B1 | 5/2001 | White, Jr. et al. | |
| 6,234,518 B1 | 5/2001 | Ryl et al. | |
| 6,273,810 B1 | 8/2001 | Rhodes, Jr. et al. | |
| 6,296,308 B1 | 10/2001 | Cosentino et al. | |
| 6,302,431 B1 | 10/2001 | Sasaki et al. | |
| 6,312,050 B1 | 11/2001 | Eklind | |
| 6,341,797 B1 | 1/2002 | Seo | |
| 6,349,993 B1 | 2/2002 | Walsh | |
| 6,352,304 B1 | 3/2002 | Sorgenfrei | |
| 6,352,310 B1 | 3/2002 | Schmidt et al. | |
| 6,357,066 B1 | 3/2002 | Pierce | |
| 6,357,789 B1 | 3/2002 | Harada et al. | |
| 6,357,827 B1 | 3/2002 | Brightbill et al. | |
| 6,364,414 B1 | 4/2002 | Specht | |
| 6,375,269 B1 | 4/2002 | Maeda et al. | |
| 6,382,720 B1 | 5/2002 | Franklin et al. | |
| 6,386,577 B1 | 5/2002 | Kan et al. | |
| 6,390,557 B1 | 5/2002 | Asano | |
| 6,394,525 B1 | 5/2002 | Seibold | |
| 6,394,546 B1 | 5/2002 | Knoblock et al. | |
| 6,398,299 B1 | 6/2002 | Angerer et al. | |
| 6,398,306 B1 | 6/2002 | Mack | |
| 6,419,317 B1 | 7/2002 | Westrich et al. | |
| 6,425,602 B1 | 7/2002 | Al-Amin et al. | |
| 6,431,734 B1 | 8/2002 | Curry | |
| 6,439,597 B1 | 8/2002 | Harada et al. | |
| 6,450,571 B1 | 9/2002 | Canni et al. | |
| 6,454,353 B1 | 9/2002 | Knaus | |
| 6,457,741 B2 | 10/2002 | Seki et al. | |
| 6,474,733 B1 | 11/2002 | Heilig et al. | |
| 6,511,130 B2 * | 1/2003 | Dinkel | B60N 2/4808 297/408 |
| 6,523,892 B1 | 2/2003 | Kage et al. | |
| 6,523,902 B2 | 2/2003 | Robinson | |
| 6,530,622 B1 | 3/2003 | Ekern et al. | |
| 6,550,856 B1 * | 4/2003 | Ganser | B60N 2/20 297/216.12 |
| 6,554,365 B2 | 4/2003 | Karschin et al. | |
| 6,557,887 B2 | 5/2003 | Wohllebe | |
| 6,561,540 B1 | 5/2003 | Hasegawa et al. | |
| 6,565,150 B2 | 5/2003 | Fischer et al. | |
| 6,565,153 B2 | 5/2003 | Hensel et al. | |
| 6,568,754 B1 | 5/2003 | Norton et al. | |
| 6,578,911 B2 | 6/2003 | Harada et al. | |
| 6,578,916 B2 * | 6/2003 | Longhi | B60N 2/0224 297/284.9 X |
| 6,588,838 B1 | 7/2003 | Dick, Jr. et al. | |
| 6,612,610 B1 | 9/2003 | Aoki et al. | |
| 6,616,177 B2 | 9/2003 | Thomas et al. | |
| 6,619,605 B2 | 9/2003 | Lambert | |
| 6,619,737 B2 | 9/2003 | Kunkel et al. | |
| 6,629,715 B2 | 10/2003 | Oh et al. | |
| 6,637,818 B2 | 10/2003 | Williams | |
| 6,672,666 B2 | 1/2004 | Stiller et al. | |
| 6,682,059 B1 | 1/2004 | Daniels et al. | |
| 6,682,140 B2 | 1/2004 | Minuth et al. | |
| 6,695,406 B2 | 2/2004 | Plant | |
| 6,698,832 B2 | 3/2004 | Boudinot | |
| 6,719,373 B2 | 4/2004 | Zimmermann | |
| 6,726,280 B1 | 4/2004 | Liao | |
| 6,733,064 B2 | 5/2004 | Fox et al. | |
| 6,736,452 B2 | 5/2004 | Aoki et al. | |
| 6,746,077 B2 | 6/2004 | Klukowski | |
| 6,758,522 B2 | 7/2004 | Ligon, Sr. et al. | |
| 6,779,560 B1 | 8/2004 | Reis | |
| 6,786,542 B1 | 9/2004 | Nuzzarello | |
| 6,802,563 B1 | 10/2004 | Mysliwiec et al. | |
| 6,808,230 B2 | 10/2004 | Buss et al. | |
| 6,811,219 B2 | 11/2004 | Hudswell et al. | |
| 6,820,640 B2 | 11/2004 | Hand et al. | |
| 6,820,930 B2 | 11/2004 | Dellanno | |
| 6,824,212 B2 | 11/2004 | Malsch et al. | |
| 6,848,742 B1 | 2/2005 | Aoki et al. | |
| 6,854,869 B1 | 2/2005 | Fernandez | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,890,030 B2 | 5/2005 | Wilkerson et al. | |
| 6,899,399 B2 | 5/2005 | Ali et al. | |
| 6,908,151 B2 | 6/2005 | Meeker et al. | |
| 6,912,748 B2 | 7/2005 | VanSickle | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,991,256 B2 | 1/2006 | Henderson et al. | |
| 6,991,289 B2 | 1/2006 | House | |
| 6,991,291 B2 * | 1/2006 | Knoblock | A47C 1/023 297/452.36 X |
| 6,997,473 B2 | 2/2006 | Tanase et al. | |
| 7,025,423 B2 | 4/2006 | Fujita et al. | |
| 7,040,699 B2 | 5/2006 | Curran et al. | |
| 7,055,904 B2 | 6/2006 | Skelly et al. | |
| 7,059,678 B1 | 6/2006 | Taylor | |
| 7,072,764 B2 | 7/2006 | Donath et al. | |
| 7,093,898 B2 | 8/2006 | Ladron De Guevara | |

(56) References Cited

U.S. PATENT DOCUMENTS

| | | |
|---|---|---|
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kämmerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,543,892 B2 * | 6/2009 | Minakawa ............... B60N 2/58 297/452.33 X |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Santamaria |
| 7,611,199 B2 * | 11/2009 | Michalak ............. B60N 2/0232 297/284.9 |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 * | 6/2011 | Walters ............... A47C 1/023 297/284.3 |
| 7,971,931 B2 | 7/2011 | Lazanja et al. |
| 7,971,937 B2 | 7/2011 | Ishii et al. |
| 3,011,728 A1 | 9/2011 | Kohl et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,033,610 B2 * | 10/2011 | Graber ............... B60N 2/2222 297/408 X |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |

(56) References Cited

U.S. PATENT DOCUMENTS

| | | |
|---|---|---|
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Wuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |
| 8,360,530 B2 | 1/2013 | Onoda et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Kotz |
| 8,540,313 B2* | 9/2013 | Fujita .................. B60N 2/028 297/354.11 X |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,696,067 B2 | 4/2014 | Galbreath et al. |
| 8,727,374 B1 | 5/2014 | Line et al. |
| 8,752,894 B2 | 6/2014 | Trimbom et al. |
| 8,794,707 B2 | 8/2014 | Bocsanyi et al. |
| 8,807,594 B2 | 8/2014 | Mizobata |
| 8,827,371 B2 | 9/2014 | Bmcick et al. |
| 8,857,908 B2* | 10/2014 | Brncick ............... B60N 2/0232 297/284.1 |
| 8,899,683 B2 | 12/2014 | Ito |
| 8,905,431 B1 | 12/2014 | Line et al. |
| 8,936,317 B2* | 1/2015 | Yamaguchi .......... B60N 2/4228 297/452.36 X |
| 8,967,663 B2 | 3/2015 | Seki et al. |
| 8,979,204 B2 | 3/2015 | Awata et al. |
| 9,045,063 B2* | 6/2015 | Line ...................... B60N 2/449 |
| 9,061,616 B2* | 6/2015 | Kondrad ................. B60N 2/22 |
| 9,090,185 B2* | 7/2015 | McMillen ............ B60N 2/4838 |
| 9,090,189 B2* | 7/2015 | Kulkarni ............... B60N 2/643 |
| 9,096,147 B2* | 8/2015 | Kulkarni ............... B60N 2/028 |
| 9,096,157 B2 | 8/2015 | Line et al. |
| 9,126,504 B2 | 9/2015 | Line et al. |
| 9,126,508 B2 | 9/2015 | Line et al. |
| 9,193,284 B2* | 11/2015 | Line ...................... B60N 2/449 |
| 9,381,840 B2* | 7/2016 | Tobata .................... B60N 2/16 |
| 9,393,891 B2* | 7/2016 | Beier .................... B60N 2/4492 |
| 9,493,095 B2* | 11/2016 | Koike .................. B60N 2/4829 |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Wampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Wolas et al. |
| 2007/0241593 A1 | 10/2007 | Woerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Aagostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Bmcick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |

(56) References Cited

U.S. PATENT DOCUMENTS

| | | |
|---|---|---|
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Bmcick et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Bmcick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1 | 9/2013 | Kulkarni et al. |
| 2013/0285426 A1 | 10/2013 | Arant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1* | 12/2014 | Line .............. B60N 2/0244 297/284.9 X |
| 2014/0361590 A1* | 12/2014 | Line .............. B60N 2/449 297/284.9 |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0197173 A1* | 7/2015 | Hulway .............. B60N 2/643 297/284.9 |
| 2015/0283970 A1 | 10/2015 | Line et al. |
| 2016/0096448 A1* | 4/2016 | Line .............. B60N 2/2222 297/354.11 |
| 2016/0096449 A1* | 4/2016 | Line .............. B60N 2/2222 297/354.11 |
| 2016/0096450 A1* | 4/2016 | Kondrad .............. B60N 2/7094 297/354.11 X |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 9415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 0174884 B1 | 9/1987 |
| EP | 0386890 A1 | 9/1990 |
| EP | 0518830 A1 | 12/1992 |
| EP | 0627339 A1 | 12/1994 |
| EP | 0670240 A1 | 9/1995 |
| EP | 0754590 A2 | 1/1997 |
| EP | 0594526 B1 | 9/1997 |
| EP | 0921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 B1 | 10/2005 |

(56) References Cited

FOREIGN PATENT DOCUMENTS

| | | |
|---|---|---|
| EP | 1084901 B1 | 6/2006 |
| EP | 1674333 A1 | 6/2006 |
| EP | 1674333 B1 | 8/2007 |
| EP | 1839932 A2 | 10/2007 |
| EP | 1950085 A3 | 12/2008 |
| EP | 1329356 B1 | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 61036029 A | 2/1986 |
| JP | 05115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| WO | WO9511818 A1 | 5/1995 |
| WO | 9534449 A1 | 12/1995 |
| WO | 9815435 A1 | 4/1998 |
| WO | 9831992 A1 | 7/1998 |
| WO | WO9958022 A1 | 11/1999 |
| WO | 0021797 A1 | 4/2000 |
| WO | 0144026 A1 | 6/2001 |
| WO | WO2006131189 A1 | 12/2006 |
| WO | 2007009893 A2 | 1/2007 |
| WO | WO2007028015 A2 | 3/2007 |
| WO | 2008019981 A1 | 2/2008 |
| WO | WO2008073285 A1 | 6/2008 |
| WO | 2010096307 A1 | 8/2010 |
| WO | WO2011021952 A1 | 2/2011 |
| WO | 2011068684 A1 | 6/2011 |
| WO | WO2012008904 A1 | 1/2012 |
| WO | 2012138699 A1 | 10/2012 |
| WO | 2013040085 A2 | 3/2013 |
| WO | 2013070905 A1 | 5/2013 |
| WO | 2013101644 A1 | 7/2013 |
| WO | 2014047417 A1 | 3/2014 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page) [Accessed from the Internet Apr. 10, 2013].

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.COM, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

Freedman Seating Company, "GO SEAT," http://www.freedmanseating.com/images/uploads/files/GOSeat_Brochure_10-19.pdf, (date unknown), 2 pgs.

Metro Magazine, "Vehicle Seating Manufacturers Offer Flexible Dseign Options, Enhanced Donstruction," http://www.metro-magazine.com/article/prinl/2012/01/vehicle-seating-manufacturers-offer-flexible-design-options-enahnced-construction.aspx, Jan. 2012, 3 pgs.

"Seat Comfort Systems", Installation Manual, KIT P/N: SCSOOOOOC3, http://www.techwebasto.com/accessories_main/seat_accessories/g_scs_vent_install.pdf, (date unknown), 7 pgs.

Car Reviews, "Audi A4 Saloon RS4", http://www.theaa.com/allaboutcars/cartestreports/2006037.html, Apr. 2006, 5 pgs.

RECARO GMBH & Co. KG, "Seat Range", ID No. 7218054, Mar. 2010, 21 pgs.

Kelley Blue Book, "2011 Mercedes-Benz CL-Class", http://www.kbb.com/mercedes-benz/cl-class/2011-mercedes-benz-cl-class/, Feb. 28, 2013, 5 pgs.

Lexus, "The all-new Lexus 2013", lexus.com P2-332, Feb. 2012, 13 pgs.

Mercedes-Benz, "Interior comfort—spoilt for choice", http://www.zungfu.com/pc_E_saloon.comfort.1.shtml, Feb. 28, 2013, 3 pgs.

Rostra Precision Controls Inc., "Universal Lumbar Installation Instructions", http://www.rostra.com/manuals/form3132F.pdf, Nov. 2, 2007, 8 pgs.

"Seats", http://www.bavarianmw.com/guide-4400.html, www.bmwmanuals.org, 2012, 5 pgs.

Mercedes-Benz, "Seat belts and airbags", http://www.mbusa.com/vcm/MB/DigitalAssets/pdfmb/serviceandparts/seatbelts_airbags.pdf, Oct. 27, 2005, 11 pages.

SAE International, "Capacitive Sensors Increase Safety, Comfort", http://sae.org/automag/technewsletter/071106Electronics/04.htm, Jun. 13, 2013, 3 pages.

General Motors LLC, "2013 Chevrolet Spark Owner Manual," copyright 2012, 356 pages.

Matthew W Ing, United States Patent and Trademark Office, Non Final Office Communication re U.S. Appl. No. 13/749,561, dated Oct. 16, 2015, 33 pages.

Richard A Lowry, United States Patent and Trademark Office, Non Final Office Communication re U.S. Appl. No. 13/748,847, dated Sep. 10, 2014, 14 pages.

David E Allred, United States Patent and Trademark Office, Non Final Office Communication re U.S. Appl. No. 13/748,857, dated Aug. 25, 2014, 13 pages.

Timothy J Brindley, United States Patent and Trademark Office, Final Office Communication re U.S. Appl. No. 13/749,568, dated Mar. 26, 2015, 9 pages.

Timothy J Brindley, United States Patent and Trademark Office, Non Final Office Communication re U.S. Appl. No. 13/749,568, dated Sep. 8, 2014, 9 pages.

Milton Nelson Jr., United States Patent and Trademark Office, Final Office Communication re U.S. Appl. No. 13/749,572, dated Mar. 3, 2015, 13 pages.

Milton Nelson Jr., United States Patent and Trademark Office, Non Final Office Communication re U.S. Appl. No. 13/749,572, dated Sep. 30, 2014, 20 pages.

Nicole T Verley, United States Patent and Trademark Office, Non Final Office Communication re U.S. Appl. No. 13/749,589, dated Oct. 4, 2013, 12 pages.

Timothy J Brindley, United States Patent and Trademark Office, Non Final Office Communication re U.S. Appl. No. 13/749,595, dated Aug. 28, 2014, 10 pages.

Timothy J Brindley, United States Patent and Trademark Office, Final Office Communication re U.S. Appl. No. 13/749,595, dated Jan. 12, 2015, 10 pages.

(56) References Cited

OTHER PUBLICATIONS

Timothy J Brindley, United States Patent and Trademark Office, Non Final Office Communication re U.S. Appl. No. 13/749,584, dated Sep. 15, 2014, 9 pages.
Yolanda G Giacoman, United States Patent and Trademark Office, Final Office Communication re U.S. Appl. No. 13/748,862, dated Dec. 30, 2015, 10 pages.
Yolanda G Giacoman, United States Patent and Trademark Office, Final Office Communication re U.S. Appl. No. 13/748,862, dated Mar. 10, 2015, 19 pages.
Yolanda G Giacoman, United States Patent and Trademark Office, Non Final Office Communication re U.S. Appl. No. 13/748,862, dated Aug. 13, 2015, 9 pages.
Yolanda G Giacoman, United States Patent and Trademark Office, Non Final Office Communication re U.S. Appl. No. 13/748,862, dated Sep. 25, 2014, 16 pages.
Milton Nelson Jr., United States Patent and Trademark Office, Non Final Office Communication re U.S. Appl. No. 13/749,602, dated Sep. 19, 2014, 9 pages.
Melissa Ann Black, United States Patent and Trademark Office, Non Final Office Communication re U.S. Appl. No. 13/914,666, dated Mar. 13, 2015, 6 pages.
Philip F Gabler, United States Patent and Trademark Office, Non Final Office Communication re U.S. Appl. No. 14/025,483, dated Dec. 17, 2014, 8 pages.
Philip F Gabler, United States Patent and Trademark Office, Final Office Communication re U.S. Appl. No. 14/025,483, dated Apr. 23, 2015, 10 pages.
Philip F Gabler, United States Patent and Trademark Office, Non Final Office Communication re U.S. Appl. No. 14/025,483, dated Aug. 18, 2015, 14 pages.
Philip F Gabler, United States Patent and Trademark Office, Final Office Communication re U.S. Appl. No. 14/025,483, dated Dec. 18, 2015, 14 pages.
Peter R Brown, United States Patent and Trademark Office, Final Office Communication re U.S. Appl. No. 14/104,780, dated Dec. 1, 2015, 5 pages.
Peter R Brown, United States Patent and Trademark Office, Non Final Office Communication re U.S. Appl. No. 14/104,780, dated Jun. 29, 2015, 9 pages.
Nicole T Verley, United States Patent and Trademark Office, Advisory Action for U.S. Appl. No. 14/056,005, dated Sep. 30, 2015, 3 pages.
Nicole T Verley, United States Patent and Trademark Office, Final Office Communication re U.S. Appl. No. 14/056,005, dated Jun. 10, 2015, 8 pages.
Nicole T Verley, United States Patent and Trademark Office, Non Final Office Communication re U.S. Appl. No. 14/056,005, dated Mar. 2, 2015, 8 pages.
Peter R Brown, United States Patent and Trademark Office, Non Final Office Communication re U.S. Appl. No. 14/056,000, dated Mar. 4, 2015, 7 pages.
Peter R Brown, United States Patent and Trademark Office, Non Final Office Communication re U.S. Appl. No. 14/056,000, dated Oct. 1, 2014, 8 pages.
Philip F Gabler, United States Patent and Trademark Office, Final Office Communication re U.S. Appl. No. 14/076,893, dated Sep. 29, 2015, 13 pages.
Philip F Gabler, United States Patent and Trademark Office, Non Final Office Communication re U.S. Appl. No. 14/076,893, dated Apr. 21, 2015, 12 pages.
David E Allred, United States Patent and Trademark Office, Non Final Office Communication re U.S. Appl. No. 14/063,647, dated Aug. 18, 2015, 19 pages.
Matthew W Ing, United States Patent and Trademark Office, Non Final Office Communication re U.S. Appl. No. 14/609,092, dated Oct. 19, 2015, 11 pages.
Alexander Scott Harrison, United States Patent and Trademark Office, Final Office Communication re U.S. Appl. No. 14/243,027, dated Jan. 20, 2016, 17 pages.
Alexander Scott Harrison, United States Patent and Trademark Office, Non Final Office Communication re U.S. Appl. No. 14/243,027, dated Aug. 13, 2015, 15 pages.
Ryan D Kwiecinski, United States Patent and Trademark Office, Non Final Office Communication re U.S. Appl. No. 14/230,961, dated Dec. 24, 2015, 12 pages.
Philip F Gabler, United States Patent and Trademark Office, Final Office Communication re U.S. Appl. No. 14/257,655, dated Dec. 18, 2015, 10 pages.
Philip F Gabler, United States Patent and Trademark Office, Non Final Office Communication re U.S. Appl. No. 14/257,655, dated Aug. 20, 2015, 10 pages.
Syed A Islam, United States Patent and Trademark Office, Final Office Communication re U.S. Appl. No. 14/275,368, dated Nov. 13, 2015, 13 pages.
Syed A Islam, United States Patent and Trademark Office, Non Final Office Communication re U.S. Appl. No. 14/275,368, dated May 6, 2015, 10 pages.
Laurie K Cranmer, United States Patent and Trademark Office, Non Final Office Communication re U.S. Appl. No. 14/505,675, dated Aug. 31, 2015, 7 pages.
Rodney Barnett White, United States Patent and Trademark Office, Non Final Office Communication re U.S. Appl. No. 14/600,166, dated Nov. 2, 2015, 7 pages.
Rodney Barnett White, United States Patent and Trademark Office, Final Office Communication re U.S. Appl. No. 14/534,296, dated Dec. 11, 2105, 14 pages.
Rodney Barnett White, United States Patent and Trademark Office, Non Final Office Communication re U.S. Appl. No. 14/534,296, dated Aug. 26, 2015, 13 pages.
Sanjeev Malhotra, United States Patent and Trademark Office, Non Final Office Communication re U.S. Appl. No. 14/534,285, dated Sep. 23, 2015, 14 pages.
Nicole T Verley, United States Patent and Trademark Office, Non Final Office Communication re U.S. Appl. No. 14/635,025, dated Dec. 4, 2015, 8 pages.

\* cited by examiner

ANTHROPOMORPHIC UPPER SEATBACK

FIELD OF THE DISCLOSURE

The present disclosure generally relates to a vehicle seating assembly, and more particularly to a seatback designed with an anthropomorphic upper seatback for a vehicle seating assembly.

BACKGROUND OF THE DISCLOSURE

Seating assemblies for vehicles typically include a seatback to support the back of an occupant in an upright seated position and various reclined positions. Seatbacks of these vehicle seating assemblies are commonly designed to support an occupant upon acceleration, change in direction, and collision of the vehicle, such that the seatbacks are substantially rigid in construction and lack adequate adjustment features.

SUMMARY OF THE DISCLOSURE

According to one aspect of the present disclosure, a vehicle seating assembly includes a seatback frame. An articulating upper thoracic region is operably coupled with the seatback frame and includes a cross-vehicle support, a torso vertical support, and a suspension support. The articulating upper thoracic region is pivotally coupled with a mid-portion of the seatback frame between stowed and deployed positions. A back panel is operably coupled to a rear side of the seatback frame. A front close-out panel is disposed between a rear portion of the articulating upper thoracic region and the back panel. A peripheral gap is disposed between the front close-out panel and the articulating upper thoracic region.

According to another aspect of the present disclosure, a vehicle seating assembly includes a seatback frame. An articulating upper thoracic region is operably coupled with the seatback frame and includes a cross-vehicle support, a torso vertical support, and a suspension support. The articulating upper thoracic region is pivotally coupled with a mid-portion of the seatback frame between stowed and deployed positions. A rear portion of the articulating upper thoracic region defines a peripheral gap.

According to yet another aspect of the present disclosure, a vehicle seating assembly includes a seatback frame. An articulating upper thoracic region is pivotally coupled with a mid-portion of the seatback frame and operable between stowed and deployed positions. A rear portion of the articulating upper thoracic region defines a peripheral gap. The articulating upper thoracic region includes a laterally-flexible cross-vehicle support, a torso vertical support, and an adjustable suspension support that is dependent on the relative position of the articulating upper thoracic region.

According to still another aspect of the present disclosure, a vehicle seating assembly includes a seatback that includes an articulating upper thoracic region configured to conform to the upper back of a seated occupant. The articulating upper thoracic region includes a cross-vehicle support, a torso vertical support, and a suspension support. Each of the support features is generally configured to provide a comfortable and safe ride to occupants ranging in size from a fifth percentile female to a ninety-fifth percentile male generally based on size characteristics including height, weight, etc. The dimensions and support in relation to the articulating upper thoracic region have been fine-tuned to specifically accommodate the anthropomorphic characteristics of a human being that satisfies the characteristics noted above.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
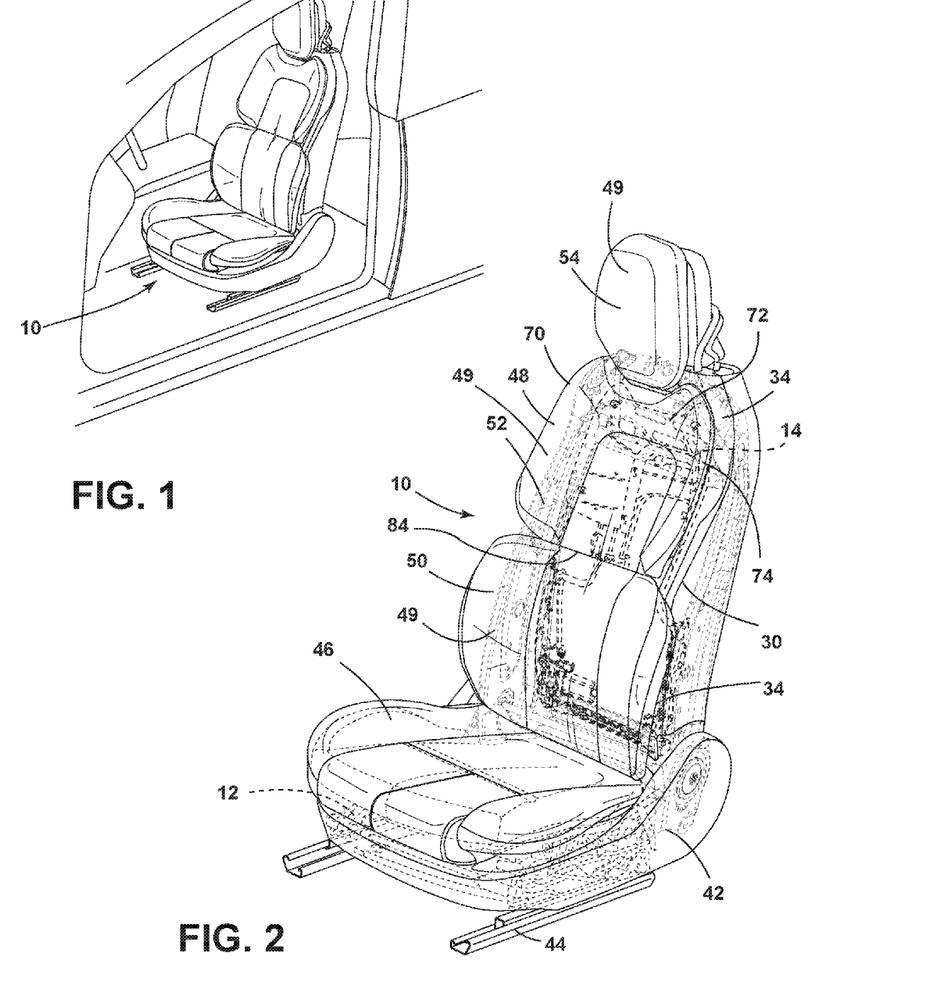
FIG. 1 is a top perspective view of one embodiment of a vehicle seating assembly of the present disclosure disposed in a vehicle.
FIG. 2 is a top perspective view of the vehicle seating assembly of FIG. 1.
Figure 3A:
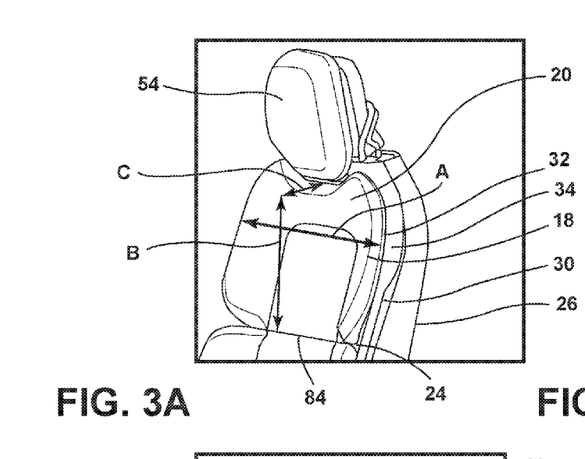
FIG. 3A is a side perspective view of an upper thoracic region of the vehicle seating assembly according to the present disclosure.
Figure 3B:
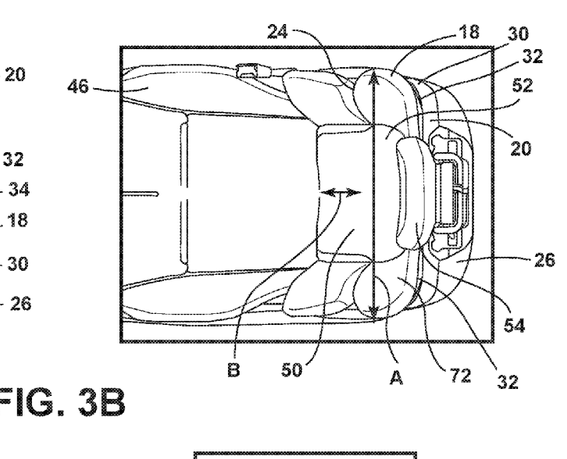
FIG. 3B is a top plan view of the upper thoracic region illustrated in FIG. 3A.
Figure 3C:
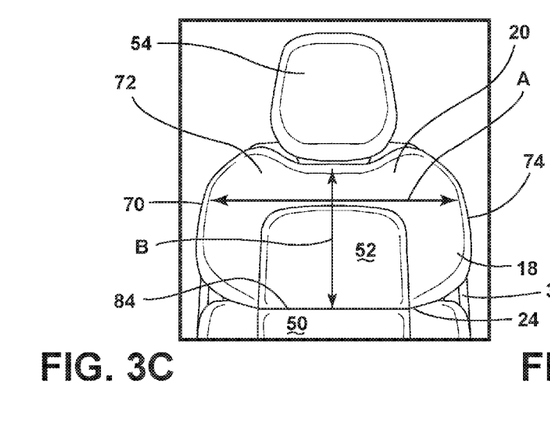
FIG. 3C is a front elevational view of the upper thoracic region illustrated in FIG. 3A.
Figure 3D:
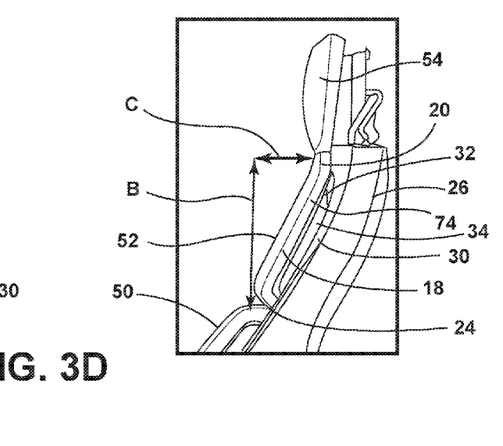
FIG. 3D is a side elevational view of the upper thoracic region illustrated in FIG. 3A.
Figures 4A, 4C:
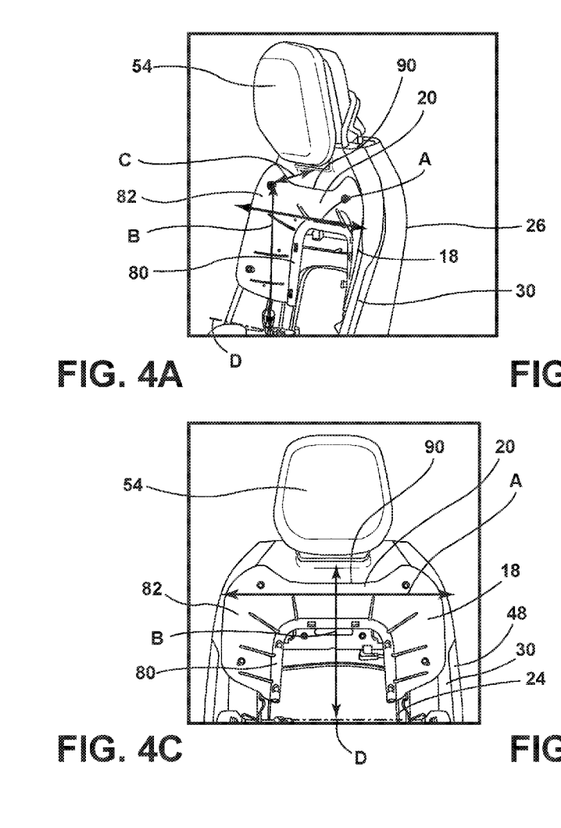
FIG. 4A is a side perspective view of an upper thoracic region of the present disclosure with a cushion assembly removed.
FIG. 4C is a front elevational view of the upper thoracic region illustrated in FIG. 4A.
Figures 4B, 4D:
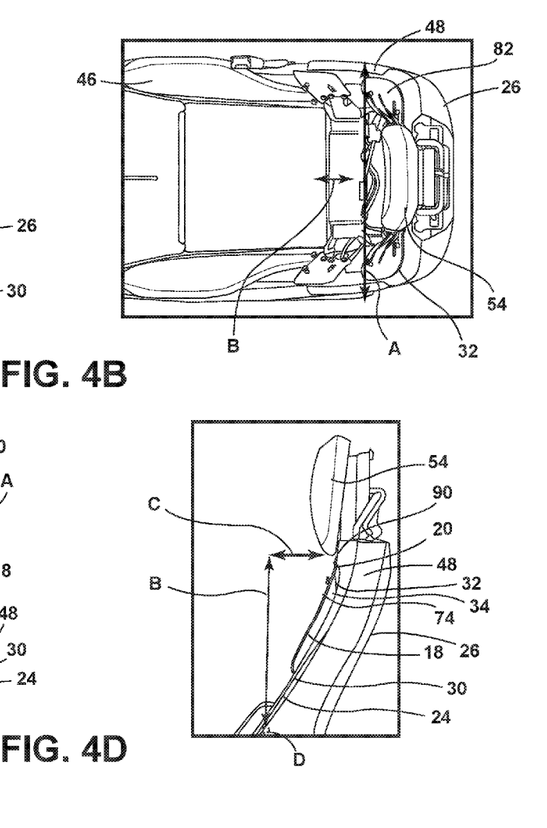
FIG. 4B is a top plan view of the upper thoracic region illustrated in FIG. 4A.
FIG. 4D is a side elevational view of the upper thoracic region illustrated in FIG. 4A.
Figures 5A, 5B:
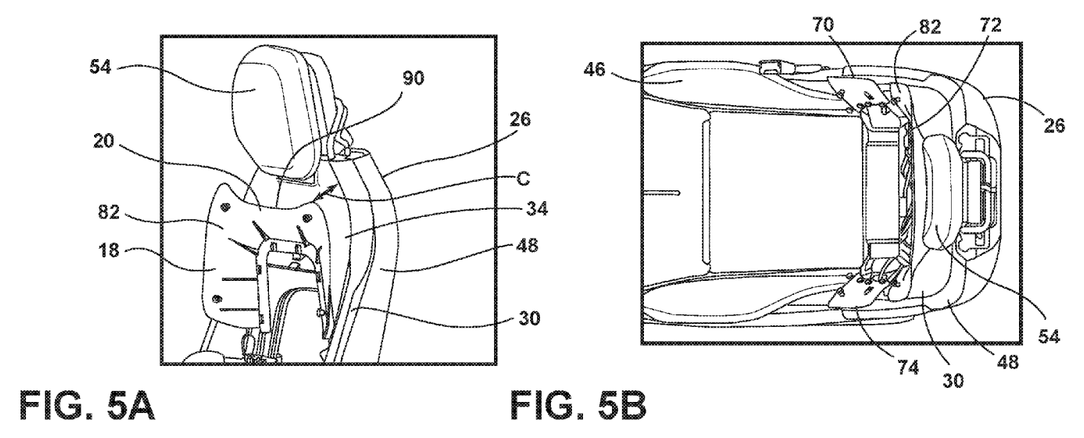
FIG. 5A is a side perspective view of an upper thoracic region of the present disclosure in a deployed position.
FIG. 5B is a top plan view of the upper thoracic region illustrated in FIG. 5A.
Figures 5C, 5D:
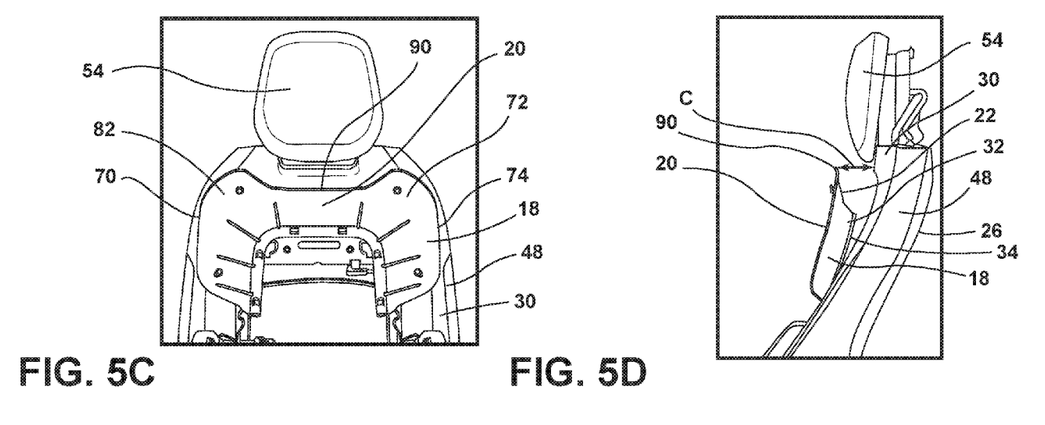
FIG. 5C is a front elevational view of the upper thoracic region illustrated in FIG. 5A.
FIG. 5D is a side elevational view of the upper thoracic region illustrated in FIG. 5A.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-5D, reference numeral 10 generally designates a vehicle seating assembly having a seatback frame 12. An articulating upper thoracic region 14 is operably coupled with the seatback frame 12 and includes a cross-vehicle support 18, a torso vertical support 20, and a suspension support 22. The articulating upper thoracic region 14 is pivotally coupled with a mid-portion 24 of the seatback frame 12 between stowed and deployed positions. A back panel 26 is operably coupled to a rear side 28 of the seatback frame 12. A front close-out panel 30 is disposed between a rear portion 32 of the articulating upper thoracic region 14 and the back panel 26. A peripheral gap 34 is disposed between the front close-out panel 30 and the articulating upper thoracic region 14 when the articulating upper thoracic region is in the stowed and the deployed positions (see FIG. 31) (stowed) and FIG. 51) (deployed)).

With reference again to FIGS. 1 and 2, the vehicle seating assembly 10 may be used in any vehicle 40, such as a car, a truck, a van, etc. It is also contemplated that the concept set forth in this disclosure may be utilized in a front or forward position of the vehicle 40 as well as in a rear or rearward position of the vehicle 40. The vehicle seating assembly 10, as illustrated, includes a seat base 42 that is positioned on rail slides 44 to allow fore and aft movement of the vehicle seating assembly 10 relative to the vehicle 40. A seat 46 is operably coupled with the seat base 42 and is movable relative thereto, as set forth in further detail below. In addition, a seatback 48 of the vehicle seating assembly 10 includes a seatback cushion assembly 49 that covers a lower lumbar region 50 and an upper thoracic region 52 as well as a head restraint 54. Each of the components of the seatback 48 may be configured for adjustability to properly support the weight of various occupants inside the vehicle 40.

The seat 46 of the vehicle seating assembly 10 generally includes the seat base 42 having first and second side bolsters adjacent thereto. In addition, first and second thigh supports are located in a forward position relative to the seat base 42. The first and second thigh supports are operable to move between forward and rearward positions, as well as being rotatable between raised and lowered positions. Functionality associated with different articulating features of the seat 46 may be manually adjusted or adjusted via a motorized system disposed inside the vehicle seating assembly 10. In addition, it will be understood that the seatback 48 is pivotally coupled with the seat 46 to allow for a variety of reclined positions relative to the seat 46.

With reference now to FIGS. 3A-3D, the illustrated seatback 48 is shown having a cross-vehicle support designated by an arrow A extending across the seatback 48 proximate the cross-vehicle support 18. The cross-vehicle support 18 provides a lateral or horizontal support to the upper back of an occupant proximate the shoulder blades of an occupant. The cross-vehicle support 18, which is provided by the articulating upper thoracic region 14 provides flexible and adjustable support to an occupant falling within the fifth percentile female size/weight to the ninety-fifth percentile male size/weight. The cross-vehicle support 18 extends from a first side 70 of a seatback cushion assembly 72 to a second side 74 of the seatback cushion assembly 72. This dimension may be generally defined as between 380 mm and 450 mm, between 400 mm and 430 mm, or approximately 417 mm. It will be understood that these dimensions have been determined based on anthropomorphic considerations associated with the size and shape of the human body and occupants that range from the fifth percentile female size/weight to the ninety-fifth percentile male size/weight. However, adjustments in the actual dimensions could be made based on a variety of other factors, including the thickness and weight of clothing, the degree of compression of the seatback cushion assembly 72, and the relative rotated position of the seatback 48 relative to the seat 46. Nevertheless, in view of the typical height and weight of the range of occupants to which the seat 46 specifically addresses performance considerations, the measurements noted above will likely suit those occupants.

In addition, the torso vertical support 20 is illustrated by arrow B. It will be understood that arrow B covers the distance between the axis of rotation of the articulating upper thoracic region 14 and a top distal end 90 of the articulating upper thoracic region 14. Stated differently, arrow B extends from the pivot axis of the upper seatback to the topmost portion of the articulating upper thoracic region 14.

The torso vertical support 20, as illustrated by arrow B, is provided by the articulating upper thoracic region 14. The structure of the articulating upper thoracic region 14, which includes an inverted U-shaped tube 80 with an outer flange 82 that extends laterally and upwardly from the U-shaped tube 80 (FIGS. 4A-4D). The U-shaped tube 80 and the outer flange 82 provide some degree of flexure relative to the seatback 48. The articulating upper thoracic region 14 is generally configured to flex rearward in a cantilevered manner approximately 14 percent to 86 percent rearward. Typically, a seam 84 between the lower lumbar region 50 and the upper thoracic region 52 of the seatback 48 will be located proximate a pivot axis D of the torso vertical support 20. The distance designated by arrow B from the axis of rotation D to a top distal end 90 of the articulating upper thoracic region 14 may be between 220 mm to 340 mm, between 260 mm and 300 mm, or approximately 288 mm. These dimensions are specifically directed to the anthropomorphic design considerations associated with providing a vehicle seating assembly 10 that will accommodate an occupant that ranges in size and weight from the fifth percentile female to the ninety-fifth percentile male.

With reference again to FIGS. 4A-4D, the same general support systems, which include the cross-vehicle support 18 and the torso vertical support 20 are illustrated with the seatback cushion assembly 49 removed from the seatback 48. Notably, there is some degree of flexure in the articulating upper thoracic region 14. More specifically, the U-shaped tube 80 and flexible outer flange 82 connected thereto provide some degree of flexure that extends across the articulating upper thoracic region 14. Unlike the distance A of the cross-vertical support 18, or the distance B of the torso vertical support 20, which remain largely unchanged, distance C of the suspension support 22 is variable and depends on the desire of an occupant to adjust the seatback 48 for comfort.

With reference now to FIGS. 5A-5D, the suspension support 22 is clearly illustrated, which provides cantilevered support from a pivot axis to a topmost portion of the articulating upper thoracic region 14. Notably, the suspension support 22 provides a varying degree of flexibility and support, depending on the relative position or degree of rotation of the articulating upper thoracic region 14, as desired by the occupant. Accordingly, more flexibility is gained when the articulating upper thoracic region 14 is in the deployed position versus when the articulating upper thoracic region 14 is in the stowed position. The overall distance of travel associated with the suspension support 22 is generally between 25 mm and 85 mm, or between 40 mm and 70 mm, or approximately 67 mm. These distances are generally associated with the anthropomorphic considerations associated with the human body for occupants ranging from the fifth percentile female to the ninety-fifth percentile male.

The vehicle seating assembly 10, as set forth herein, and the cross-vehicle support 18, the torso vertical support 20, and the suspension support 22 are particularly tailored to the size and weight of a human body ranging from the fifth percentile female to the ninety-fifth percentile male. Traditional seating arrangements for vehicles are often constructed based on ease of manufacture and constraints associated with the available space inside the vehicle 40. Accordingly, the sizes and dimensions, as set forth herein, and as associated with the support provided to an occupant ranging from a fifth percentile female to a ninety-fifth percentile male, are important. It will be understood by one having ordinary skill in the art that traditional seating arrangements do not cater to individuals that fall within this range, and instead, provide more of a "one size fits all" seating system that does not fit occupants comfortably.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
   a seatback frame;
   an articulating upper thoracic region operably coupled with the seatback frame and comprising:
   a cross-vehicle support;
   a torso vertical support; and
   a suspension support;
   wherein the articulating upper thoracic region is pivotally coupled with a mid-portion of the seatback frame between stowed and deployed positions;
   a back panel operably coupled to a rear side of the seatback frame;
   a front close-out panel disposed between a rear portion of the articulating upper thoracic region and the back panel; and
   a peripheral gap disposed between the front close-out panel and the articulating upper thoracic region when the articulating upper thoracic region is in the stowed and the deployed positions.

2. The vehicle seating assembly of claim 1, wherein a lateral distance from a first side to a second side of the cross-vehicle support is approximately 400 mm to 430 mm.

3. The vehicle seating assembly of claim 2, wherein the lateral distance from a first side to a second side of the cross-vehicle support is approximately 417 mm.

4. The vehicle seating assembly of claim 1, wherein the torso vertical support extends upwardly from a mid-portion of the seatback frame approximately 260 mm to 300 mm.

5. The vehicle seating assembly of claim 4, wherein the torso vertical support extends upwardly from a mid-portion of the seatback frame approximately 288 mm.

6. The vehicle seating assembly of claim 1, wherein the articulating upper thoracic region is rotatable to a position that translates a top edge of the articulating upper thoracic region forward approximately 40 mm to 70 mm, increasing the width of the peripheral gap at the top of the seatback frame.

7. A vehicle seating assembly comprising:
   a seatback frame;
   an articulating upper thoracic region operably coupled with the seatback frame and comprising:
   a cross-vehicle support;
   a torso vertical support; and a suspension support; and
   wherein the articulating upper thoracic region is pivotally coupled with the seatback frame between stowed and deployed positions, and defines a peripheral gap in the stowed and the deployed positions.

8. The vehicle seating assembly of claim 7, wherein a lateral distance from a first side to a second side of the cross-vehicle support is approximately 400 mm to 430 mm.

9. The vehicle seating assembly of claim 8, wherein the lateral distance from a first side to a second side of the cross-vehicle support is approximately 417 mm.

10. The vehicle seating assembly of claim 7, wherein the torso vertical support extends upwardly from a mid-portion of the seatback frame approximately 260 mm to 300 mm.

11. The vehicle seating assembly of claim 10, wherein the torso vertical support extends upwardly from a mid-portion of the seatback frame approximately 288 mm.

12. The vehicle seating assembly of claim 7, wherein the articulating upper thoracic region is rotatable to a position that translates a top edge of the articulating upper thoracic region forward approximately 40 mm to 70 mm, increasing a width of the peripheral gap at the top of the seatback frame.

13. The vehicle seating assembly of claim 12, wherein the articulating upper thoracic region is configured to flex rearward in a cantilevered manner approximately 14 percent to 86 percent rearward.

14. A vehicle seating assembly comprising:
a seatback frame;
an articulating upper thoracic region pivotally coupled with a mid-portion of the seatback frame and operable between stowed and deployed positions, wherein a rear portion of the articulating upper thoracic region defines a peripheral gap, the articulating upper thoracic region including:
a laterally-flexible cross-vehicle support; a torso vertical support; and
an adjustable suspension support that is dependent on a relative position of the articulating upper thoracic region.

15. The vehicle seating assembly of claim 14, wherein a lateral distance from a first side to a second side of the laterally-flexible cross-vehicle support is approximately 400 mm to 430 mm.

16. The vehicle seating assembly of claim 15, wherein the lateral distance from a first side to a second side of the laterally-flexible cross-vehicle support is approximately 417 mm.

17. The vehicle seating assembly of claim 14, wherein the torso vertical support extends upwardly from a mid-portion of the seatback frame approximately 260 mm to 300 mm.

18. The vehicle seating assembly of claim 17, wherein the torso vertical support extends upwardly from a mid-portion of the seatback frame approximately 288 mm.

19. The vehicle seating assembly of claim 14, wherein the articulating upper thoracic region is rotatable to a position that translates a top edge of the articulating upper thoracic region forward approximately 40 mm to 70 mm, increasing a width of the peripheral gap at the top of the seatback frame.

20. The vehicle seating assembly of claim 19, wherein the articulating upper thoracic region is configured to flex rearward in a cantilevered manner approximately 14 percent to 86 percent rearward.

\* \* \* \* \*